J. G. WINSOR.
DUMP BODY.
APPLICATION FILED SEPT. 28, 1914.

1,181,192.

Patented May 2, 1916.
3 SHEETS—SHEET 1.

WITNESSES
INVENTOR
James G. Winsor
BY
Raymond A. Parker
ATTORNEY

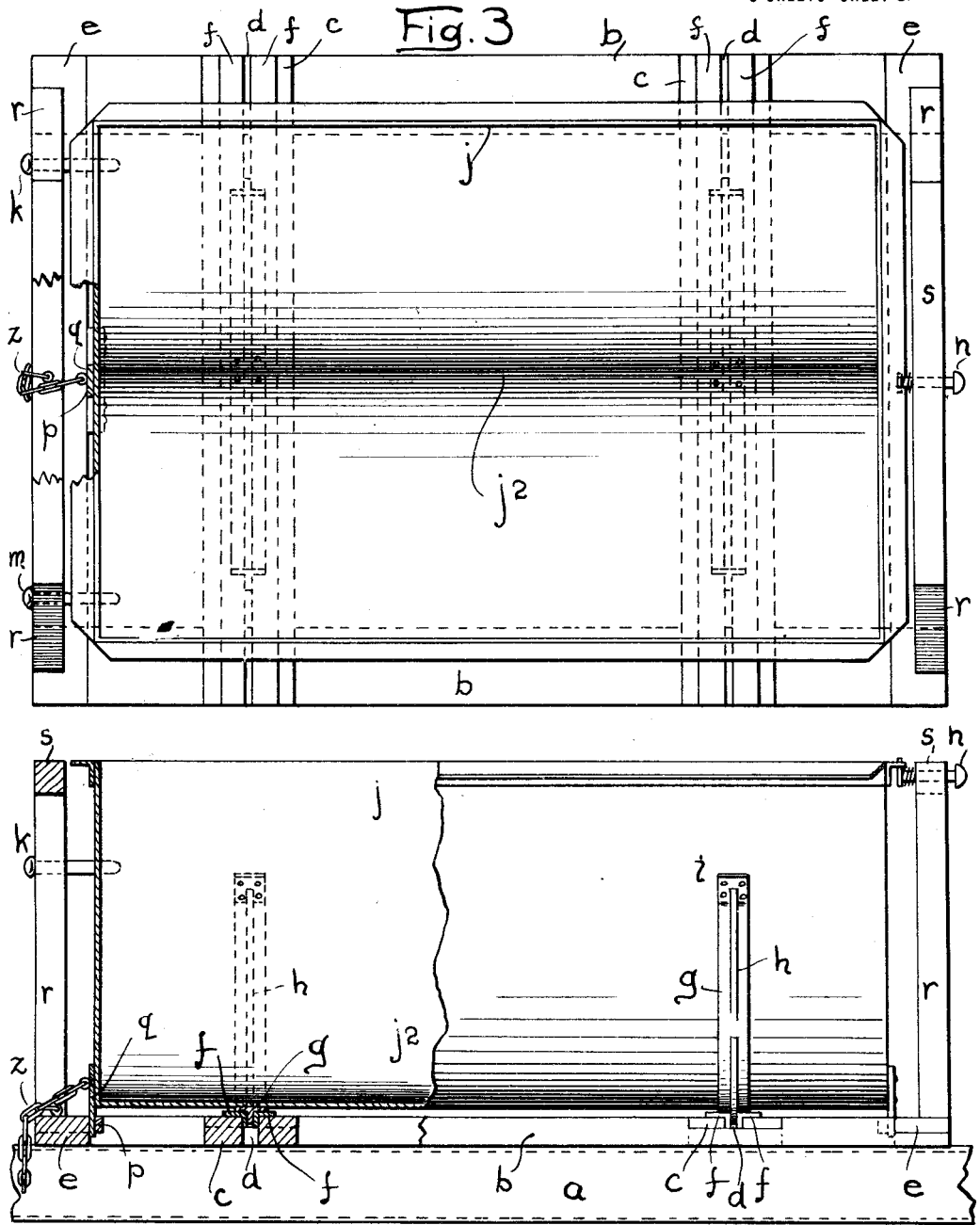

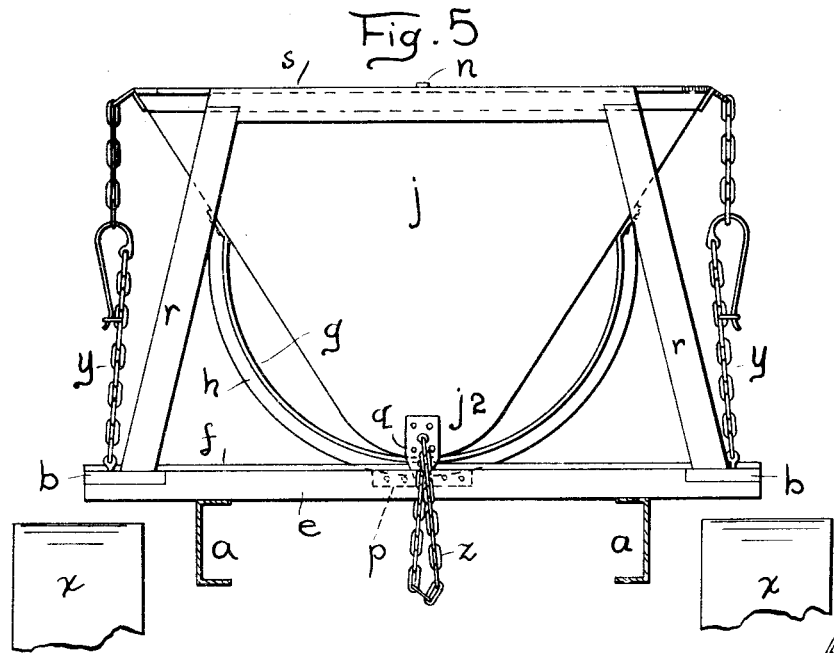
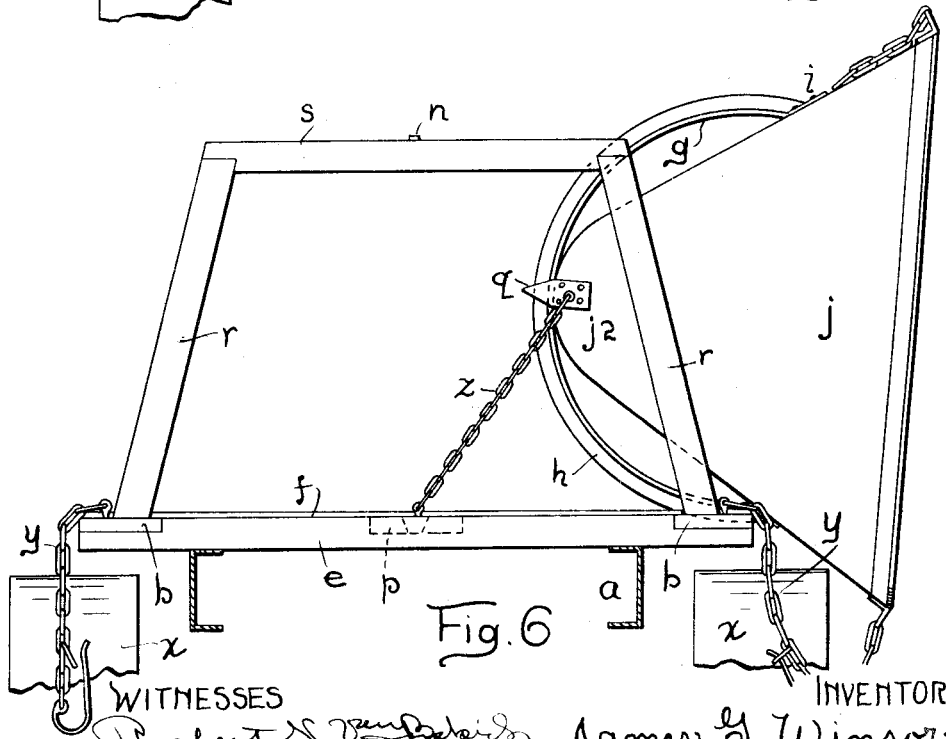

UNITED STATES PATENT OFFICE.

JAMES G. WINSOR, OF DETROIT, MICHIGAN.

DUMP-BODY.

1,181,192.  Specification of Letters Patent.  Patented May 2, 1916.

Application filed September 28, 1914. Serial No. 863,785.

*To all whom it may concern:*

Be it known that I, JAMES G. WINSOR, a citizen of the United States, residing at Detroit, county of Wayne, State of Michigan, have invented a certain new and useful Improvement in Dump-Bodies, and declare the following to be a full, clear, and exact description of the same, such as will enable others skilled in the art to which it pertains to make and use the same, reference being had to the accompanying drawings, which form a part of this specification.

Figure 1:
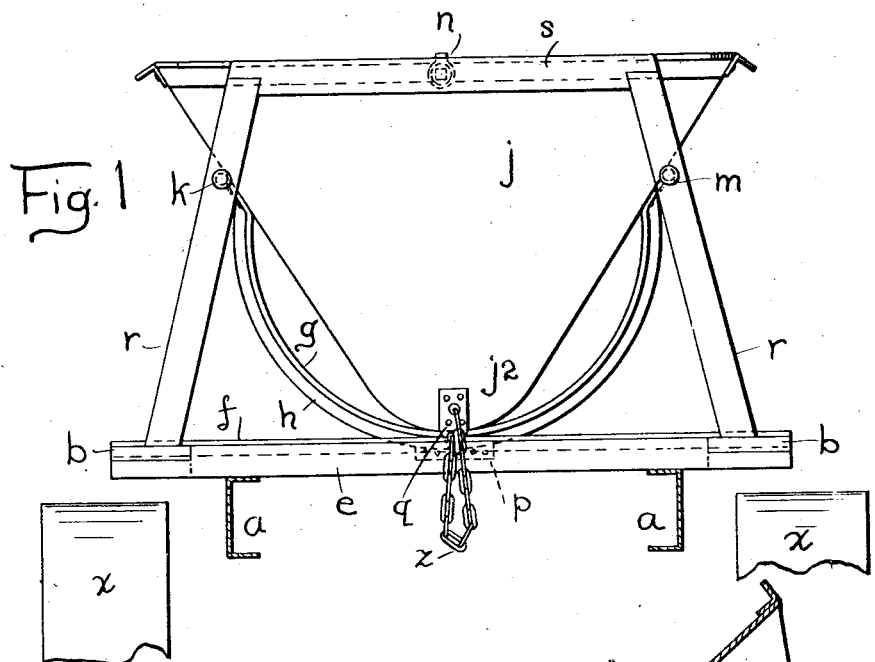
Figure 4:
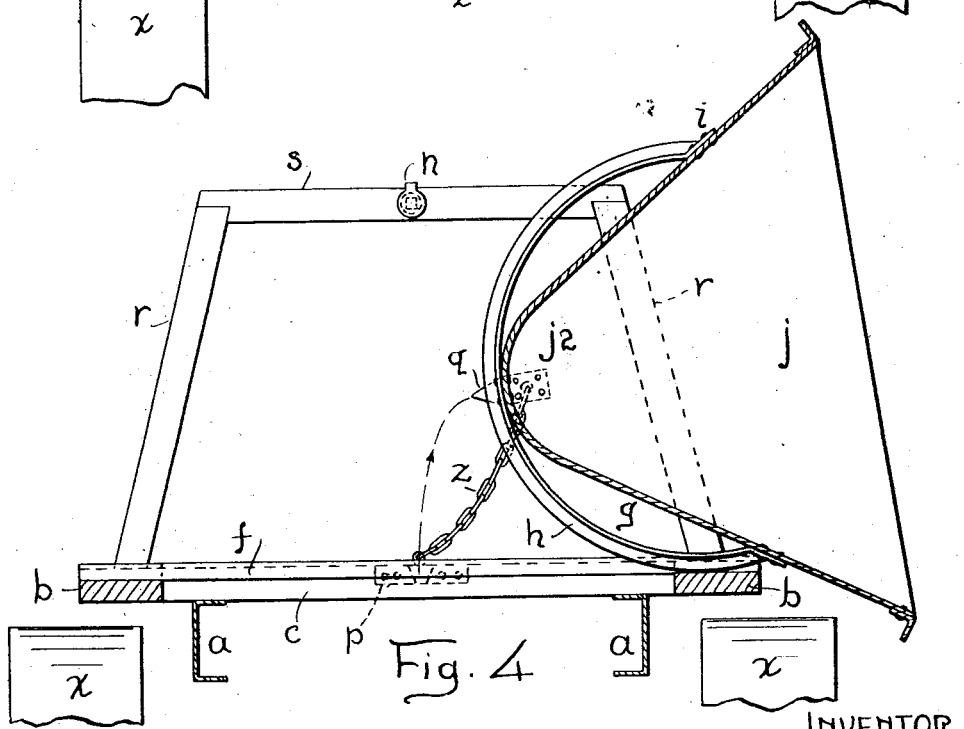

My invention relates to dump bodies for vehicles and an object of my improvements is to secure a simple construction that is cheap to build and convenient to operate and one that may employ standard parts that may be bought on the market. I secure this object in the device illustrated in the accompanying drawings in which, Figure 1, is an end elevation of an apparatus embodying my invention, the side pieces of the vehicle upon which said apparatus is mounted being shown in section. Fig. 2, is a side elevation of the same, the left hand half being broken away to show the construction in section. Fig. 3, is a plan view. Fig. 4, is a sectional elevation, the body being shown in section and in a position approaching that for discharging the load. Fig. 5, is a view similar to Fig. 1, showing a modified construction. Fig. 6, shows the body at the limit of its motion in discharging the load, the modification of Fig. 5 being also shown.

$a$ $a$ are for, example, the side pieces of the chassis of an automobile.

$b$ $b$ are the side pieces of a frame upon which the dump body is mounted. $x$ $x$ are the wheels of the vehicle. $e$ $e$ are the end pieces of said frame and $c$ $c$ are cross pieces intermediate the end pieces $e$ $e$.

$d$ $d$ indicates transverse slots extending through the cross pieces $c$.

$f$ $f$ are angle irons mounted adjacent to each other on the cross pieces $c$ $c$ on the upper corners of the slots $d$. These angle irons have horizontal and vertical portions lying upon corresponding surfaces of a cross piece $c$. The vertical portions are parallel and spaced from each other so as to leave a transverse slot between the vertical portions of said angle irons.

$j$, is a body for containing earth, sand, or similar material and having a V-like cross section, as shown in the drawings, the point or narrower portion $j^2$ being at the bottom of the body when the same is in its normal position for receiving a load.

$g$, $g$ are T-irons each being bent in approximately the form of an arc of a circle, or wheel forming a rocker extending in a plane transverse to the body, secured at its end to the sides, extending under, and, at its center, secured to the lower portion $j^2$ of the body.

The irons $g$ $g$ touch the body at their centers and extend beyond the body each way from the center so that the inner edge of the lower side of the body shall be raised to discharge the load by gravity when the body is in dumping position, as shown in Fig. 4. $h$ is a fin on the iron $g$, which extends outward and is adapted to fit into the slot between the angle irons $f$ $f$, as shown in Fig. 2. The flanges of the T-irons $g$ rest and roll upon the horizontal flanges of the angle irons $f$ $f$ so that said irons constitute rockers upon which said body rolls to its dumping position. This construction permits of the body rolling easily while the fin $h$ secures the body in position.

$r$ $r$ are standards, arising approximately vertically but converging slightly toward each other, from the frame $b$ $e$ $c$.

$s$ is a cross piece extending between the upper ends of the uprights $r$ $r$.

$k$ and $m$ are latches in the standards $r$ $r$ adapted to engage in the sides of the body $j$ to hold it in its vertical position.

$n$ is a latch located in the middle of a cross piece $s$ and adapted to automatically secure the body in its vertical position. $p$, indicates a socket located at the center of an end piece $e$. $q$, is a lug secured at the end $j^2$ and extending below said body and adapted to pass into the socket $p$ when the body is in its vertical position.

$z$, is a chain secured to the lug $q$ and at the center of a cross piece $e$, and serving to limit the rocking motion of the body.

The T-iron $g$ is bent into such a form that the empty body $j$ will automatically return to its vertical position.

The frame $b$ $c$ $e$ may be easily adjusted upon the side pieces $a$ $a$. The angle irons $f$ $f$ are standard constructions which may be bought upon the market, as well as the T-irons $g$ $h$, and they are readily adjusted into position. The angle irons $f$ $f$ form a convenient track by their horizontal flanges and they leave a slot between their vertical flanges convenient to receive the fin *h* of the T-iron *g* and guide the same while any dirt falling into said slot will pass through it and will not accumulate and obstruct the action of the apparatus.

Instead of the bolts *k m*, detachable chains *y y* may be used for securing the body in its upright position and if one of the two securing devices is released the body will be free to turn in one direction only on releasing the latch *n*.

Any length of body may be employed by using the proper number of supporting rockers and tracks. The rockers extending under the body carry the same beyond the wheels in the travel to the dumping position.

What I claim is:

1. The combination of a body, a T-iron bent to form a rocker and secured so as to extend transversely under said body with its fin extending outward therefrom, a frame having two parallel adjacent cross-pieces having upper horizontal surfaces and adjacent opposite vertical surfaces, two angle irons having horizontal and vertical portions, said angle irons being secured to said cross-pieces with their horizontal surfaces upon the horizontal surfaces of said cross-pieces and their vertical portions extending downward between said cross-pieces and lying parallel and spaced from each other, the flanges of said T-iron resting upon and being adapted to roll upon the horizontal portions of said angle irons and the fin of said T-iron fitting between the vertical portions of said angle iron, for the purpose described.

2. The combination with a vehicle, a horizontal transverse way on said vehicle, a body V-shaped in cross section having sides converging downward toward a center, a rocker engaging said way shaped in approximately the arc of a circle extending under and adjacent to the lower portion of said body at its center, and extending farther from the surface of said body and rising above the lower part of said body toward each end, the sides of said body, when in its upright position, being inside of the other lateral limits of said vehicle, said rocker being adapted to carry said body laterally of the vehicle so that its dumping edge shall be beyond said limits when said body is rocked to its dumping position and the side along the surface of which the load is discharged shall have its inner edge elevated because of the said extension of the rocker beyond the surface of the body, so that the load shall slide therefrom by gravity.

In testimony whereof, I sign this specification in the presence of two witnesses.

JAMES G. WINSOR.

Witnesses:
  AGNES M. HIPKINS,
  ELLIOTT J. STODDARD.